(12) United States Patent
Llorente González

(10) Patent No.: US 8,207,624 B2
(45) Date of Patent: Jun. 26, 2012

(54) WIND TURBINE

(75) Inventor: José Ignacio Llorente González, Pamplona (ES)

(73) Assignee: Gamesa Innovation & Technology, S.L, Pamplona (Navarra) (ES)

( * ) Notice: Subject to any disclaimer, the term of this patent is extended or adjusted under 35 U.S.C. 154(b) by 625 days.

(21) Appl. No.: 11/921,718

(22) PCT Filed: Jun. 13, 2006

(86) PCT No.: PCT/ES2006/000342
§ 371 (c)(1),
(2), (4) Date: Aug. 10, 2009

(87) PCT Pub. No.: WO2006/134189
PCT Pub. Date: Dec. 21, 2006

(65) Prior Publication Data
US 2009/0309369 A1    Dec. 17, 2009

(30) Foreign Application Priority Data

Jun. 13, 2005  (ES) .................................. 200501417

(51) Int. Cl.
*F03D 11/04* (2006.01)
*F16H 57/08* (2006.01)
(52) U.S. Cl. .......................................... 290/55; 475/338
(58) Field of Classification Search .................... 290/43, 290/44, 54, 55; 475/338, 347
See application file for complete search history.

(56) References Cited

U.S. PATENT DOCUMENTS

| 5,663,600 | A  | * | 9/1997  | Baek et al.     | 290/55  |
| 7,008,348 | B2 | * | 3/2006  | LaBath          | 475/338 |
| 7,815,536 | B2 | * | 10/2010 | Jansen et al.   | 475/159 |
| 7,893,555 | B2 | * | 2/2011  | Casazza et al.  | 290/55  |
| 7,935,020 | B2 | * | 5/2011  | Jansen et al.   | 475/338 |

FOREIGN PATENT DOCUMENTS

| ES | 2 226 631   | 4/2005  |
| GB | 2 395 529   | 5/2004  |
| WO | 96/11338    | 4/1996  |
| WO | 02/079644   | 10/2002 |
| WO | 03/014567   | 2/2003  |

* cited by examiner

*Primary Examiner* — Nicholas Ponomarenko
(74) *Attorney, Agent, or Firm* — Ladas & Parry LLP

(57) ABSTRACT

The invention relates to a wind turbine comprising a rotor shaft (11), a multiplier (3) with at least one planetary-type stage and a generator inside a frame (1). The inventive turbine also comprises a first tubular casing (13) which is solidly connected to the frame (1) and which houses the rotor shaft (11). According to the invention, one end of the rotor shaft is solidly connected to the hub of the rotor, while the other end thereof is solidly connected to the planet carrier (21) of the multiplier unit. The aforementioned first casing includes a bearing (15) for supporting the rotor shaft (11). The invention also comprises a second casing (17) which is equipped with a bearing (19) for supporting the planet holder (21), one end of said second casing being solidly connected to the crown gear of the first planetary stage of the multiplier unit (3) and the other end thereof being solidly connected to the first casing (13) and to the structure of the frame (1).

6 Claims, 1 Drawing Sheet

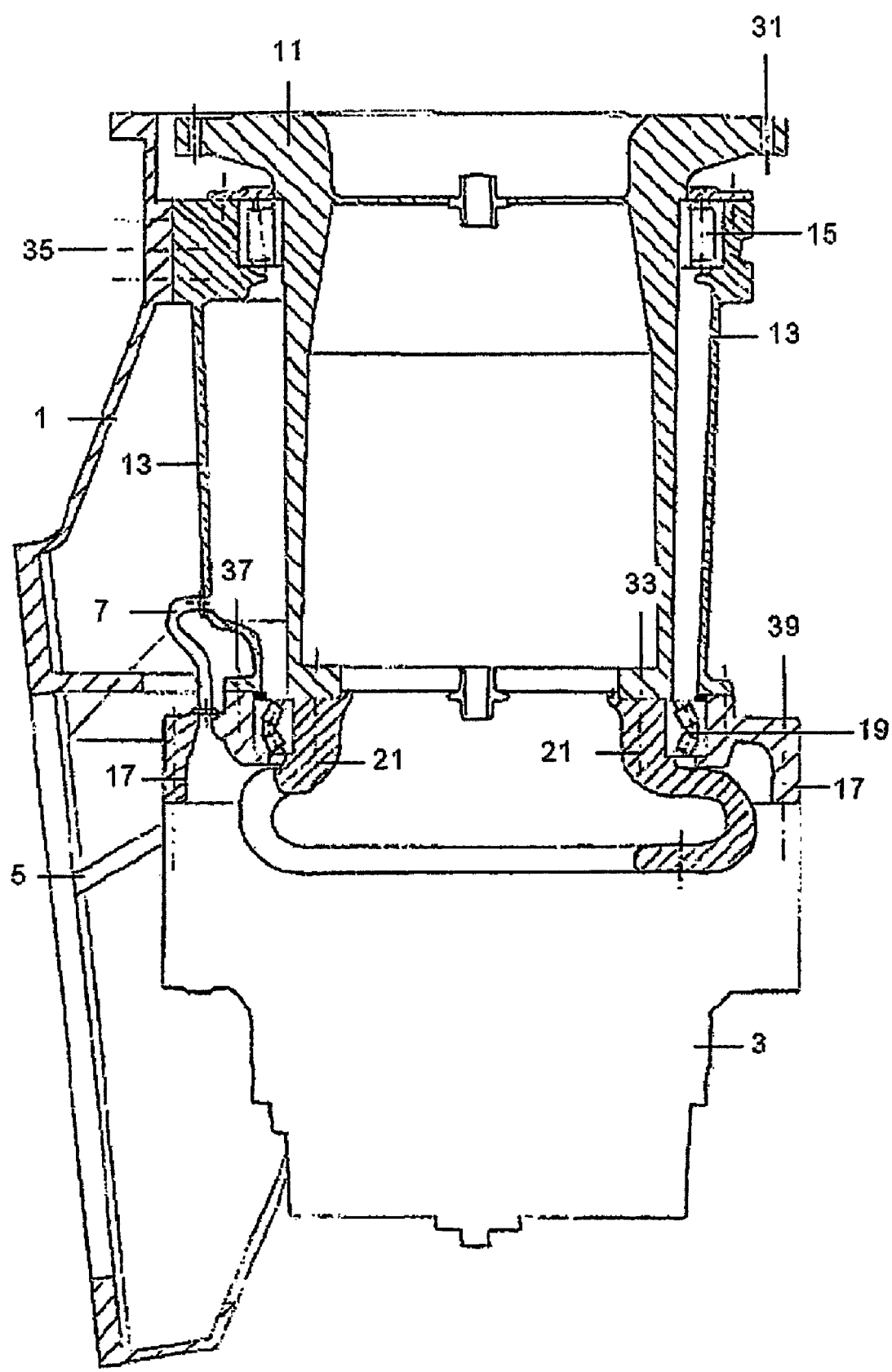

WIND TURBINE

FIELD OF THE INVENTION

This invention refers to the turbine of a wind generator and particularly to the structure of the coupling between the rotor and the multiplier unit.

BACKGROUND OF THE INVENTION

The development of wind generators depends on the energy they produce, this means the elements they are made up of need to be larger as they are subject to greater external loads, so their service life decreases and at the same time their cost clearly rises.

One of the elements that is mostly affected by this is power train, which includes the multiplier unit, the high speed shaft and the generator and especially, the low speed shaft, responsible for coupling the rotor with the multiplier unit.

We will comment on several couplings known in the technique to join the rotor of the wind generator with the elements of its power train.

At a theoretical level, in "Electrical Energy Propipeion Wind Systems" (Sistemas Eólicos de Energia Eléctrica) by J. L. Rodriguez Amedo, J. C. Burgos Diaz and S. Arnalte Gómez (Ed. Rueda S. L., Madrid 2003), three types of couplings are mentioned between the rotor shaft and the multiplier unit:

By means of support of the rotor shaft on two bearings which are separated one from the other and fitted to the base of the nacelle, in a way that all the unwanted forces are transmitted to the tower, and the multiplier unit only supports the torque transmitted by the rotor blades. In this type of configuration, an elastic disc is normally used in the coupling between the rotor shaft and the multiplier unit to absorb the slight misalignments between them.

By means of support of the rotor shaft on only one bearing integral to the base of the nacelle and another support on a bearing integrated in the multiplier unit, and in this way using an elastic disc in the coupling between the rotor shaft and the multiplier unit. This way the loads transmitted to the tower are reduced as the distance between the bearings can be minimised. Still, in these two first configurations, the rotor shaft is subject to stressful bending moments which imply very strong designs of the components of the power train, and even needing torque arms in the multiplier unit to absorb the transmitted loads.

With the rotor shaft joined to a fixed support connected to the tower by means of a flange, whose purpose is to absorb the bending moments transmitted by the rotor.

There are also couplings between the rotor shaft and the multiplier unit in patent documents as shown below:

Patent application WO9611338 describes, according to its FIGS. 1 and 2, the couplings used in the known turbines. According to FIG. 1, the rotor shaft is placed onto two bearings directly supported by the nacelle as well as a third bearing placed in the multiplier unit. According to FIG. 2, the rotor shaft is placed onto two bearings directly supported by the nacelle which means a high transmission of unwanted forces to the multiplier unit.

Patent application WO02079644 describes a turbine in which the multiplier unit is directly coupled to the hub, in this way doing without the rotor shaft.

Patent application WO03031811 describes a coupling mechanism in which the rotor shaft is supported on the nacelle of the wind generator by means of two bearings.

Patent application WO04046582, like WO02079644, describes a turbine in which the multiplier unit is directly coupled to the hub, in this way doing without the rotor shaft and therefore transmitting the forces and moments generated by the blades to the nacelle by means of the bearings onto the multiplier unit.

None of the systems mentioned satisfactorily solves the requirements presented by high power wind turbines that the industry needs. This invention tries to satisfy these needs.

SUMMARY OF THE INVENTION

This invention suggests a wind turbine driven by a rotor blade of the type included in a rotor shaft, a multiplier unit with, at least, a planetary stage and a generator, the rotor shaft being fitted to two separated bearing supports, one of them integrated in the multiplier unit, characterised by:

a) the rotor shaft is joined on one side to the hub and on the other side to the planet carrier where the planets of the multiplier unit will be situated;

b) it includes a first tubular-form casing, fixed to the nacelle, that holds the rotor shaft in it, including a bearing supporting the rotor shaft at a point near the hub;

c) it includes a second casing, in which the support bearing of the planet carrier is included, which is fixed on one of its sides to the gear ring of the multiplier unit, and on the other side to the first casing and also to the nacelle.

With this structure, the coupling between the rotor shaft and the multiplier unit is configured by a fixed part, made up of the two mentioned casings, fixed to the nacelle, and a moveable part made up of the rotor shaft and the planet carrier, responsible for transmitting the torque generated by the rotor to the rest of the moveable elements.

Other characteristics and advantages of this invention will be found in the detailed description in relation with the figures attached.

DESCRIPTION OF THE FIGURES

FIG. 1 is a transverse view of a possible coupling configuration of the rotor shaft to the multiplier unit according to the invention.

DETAILED DESCRIPTION OF THE INVENTION

FIG. 1 shows the essential elements of the coupling: the rotor shaft 11, the first casing 13 with the bearing 15, the second casing 17 with the bearing 19 and the planet carrier 21.

The rotor shaft 11 joins, on one side, the hub (not presented) by means of fixing elements 33, making up the moveable part of the coupling.

The first casing 13 is integrally joined, on one side, to the nacelle 1 by means of fixing elements 35, and, on the other side, to the second casing 17 by means of fixing elements 37, making up the fixed part of the coupling. In turn, the second casing 17 is joined, on the other side, to the gear ring of the multiplier unit 3 by means of fixing elements 39. The second casing 17 is fixed to the nacelle 1 by means of the anchors in its ribs 5 (not represented in real size).

The rotor shaft 11 is supported on bearing 15 and the planet carrier is supported on bearing 19.

The fixed and moveable parts of the coupling work as one single integrated set. The rotor shaft 11 is supported on bearing 15 situated in the first casing 13 and is fixed to the planet carrier 21, which is supported on a bearing 19 situated in the second casing 17. The fixed part is anchored to the nacelle 1 and the moveable part transmits the torque generated by the rotor blade. The rotor shaft 11 cannot work if it is not fixed to the planet carrier 21, and the planet carrier cannot drive the satellites of the multiplier unit 3 if it is not coupled to the rotor shaft 11. The bearing 15 is fitted onto the first casing 13 of the coupling's fixed part at the level of the fixing elements.

The bearing 19 is fitted to the second casing 17 of the coupling's fixed part. At the same time, the second casing 17 is joined to the first casing 13 by means of the fixing elements 37.

Bearings 15 and 19 are simultaneously used by the coupling's moveable part and the multiplier unit's 3 moveable elements, avoiding the redundancy of bearings in the set made up of the main shaft and the planet carrier present in those previously used solutions which included two bearings for the rotor shaft and another one for the planet carrier of the multiplier unit, and thus avoiding a hyperstatic system. In this sense, the design of the bearings is characterised by the fact that one of two bearings 15 or 19 must have restricted axial displacement by setting the conical bearings in X in order to support the bending moments and the axial thrusts that the assembly receives, while the second bearing 15 or 19 is axially free.

Lubrication of the bearings is carried out by means of a tank connected to the storage tank of the multiplier unit through a pipe 7.

As an expert will well understand, the length of the different coupling elements is calculated according to the bending moments and the normal and tangential axial forces expected on the rotor shaft.

With this configuration the size of the rotor shaft 11 is reduced which, along with the direct coupling with the planet carrier 21, allows us to achieve an isostatic structure able to absorb vibrations coming from the rotor blade. In this way, we are able of achieving a coupling that is able to use the torque generated by the rotor blade and dissipate the rest of damaging forces and vibrations thanks to the bearings 15 and 19 that direct them to the nacelle and to the tower of the wind generator. In this way the multiplier unit 3 is protected from the damaging effects transmitted by the rotor blade, also reducing the risk of damage in the rest of the components of the turbine; this allows for a better size and longer duration of all of its elements, without the need of additional elements such as elastic discs or torque arms used in the previous technique.

The invention claimed is:

1. Wind turbine driven by a rotor with at least two blades which includes a rotor shaft (11), a multiplier unit (3) with, at least, a planetary type stage and a generator into a nacelle (1), of the type in which the rotor shaft (11) is fitted to two separated bearing supports, one of them integrated in the multiplier unit (3), characterised by:
   a) the rotor shaft (11) is joined on one side to the hub and on the other side to the planet carrier (21) of the multiplier unit;
   b) it also includes a first tubular-form casing (13), fixed to the nacelle(1), that holds the rotor shaft (11) in it and includes a bearing (15) of the rotor shaft (11) near the hub;
   c) it also includes a second casing (17), in which the bearing (19) of the planet carrier (21) is placed, which is fixed on one of its sides to the first planetary stage gear ring of the multiplier unit (3), and on the other side to the first casing (13) and also to the nacelle (1).

2. Wind turbine according to claim 1, characterised by the bearing (15) of the rotor shaft (11) is fitted to the first casing (13) at the level of the fixing elements (35) on the nacelle (1).

3. Wind turbine according to claim 1, characterised by the bearing (19) of the planet carrier (21) is fitted to the second casing (17) next to the fixing elements (37) of the first casing (13).

4. Wind turbine according to claim 2, characterised by one of the bearings (15, 19) of the rotor shaft (11) or the planet carrier (21) is configured so that it remains axially free, while the other bearing has restricted axial movement by setting the conical bearings in X.

5. Wind turbine according to claim 1, characterised by it also includes a communication pipe (7) between the multiplier unit (3) and the first casing (13) in order to share the lubricating oil.

6. Wind turbine according to claim 3, characterised by one of the bearings (15, 19) of the rotor shaft (11) or the planet carrier (21) is configured so that it remains axially free, while the other bearing has restricted axial movement by setting the conical bearings in X.

* * * * *